Figure 1:
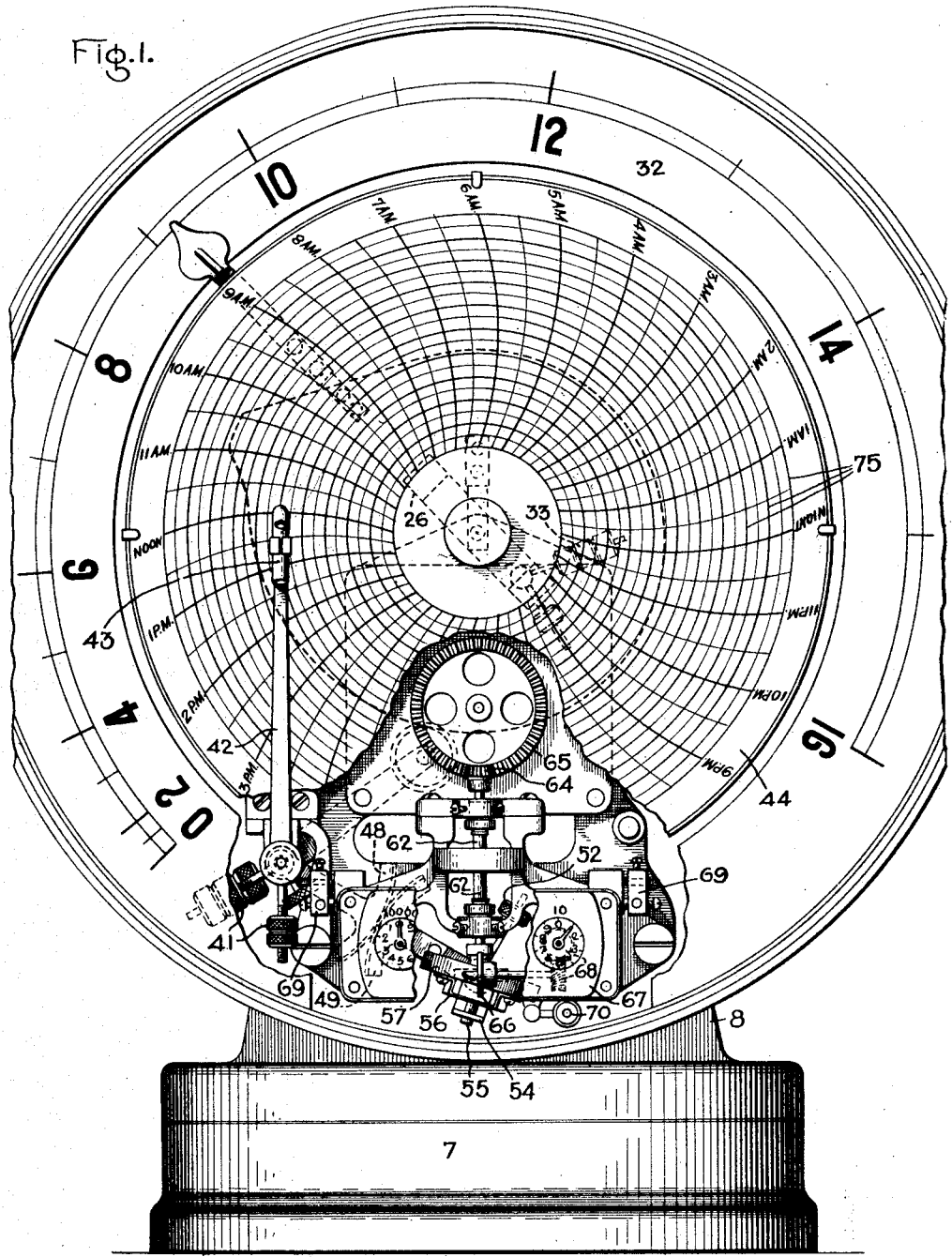

A. R. DODGE.
MEASURING INSTRUMENT.
APPLICATION FILED DEC. 6, 1915.

1,208,518.

Patented Dec. 12, 1916.
3 SHEETS—SHEET 1.

Inventor:
Austin R. Dodge,
by
His Attorney.

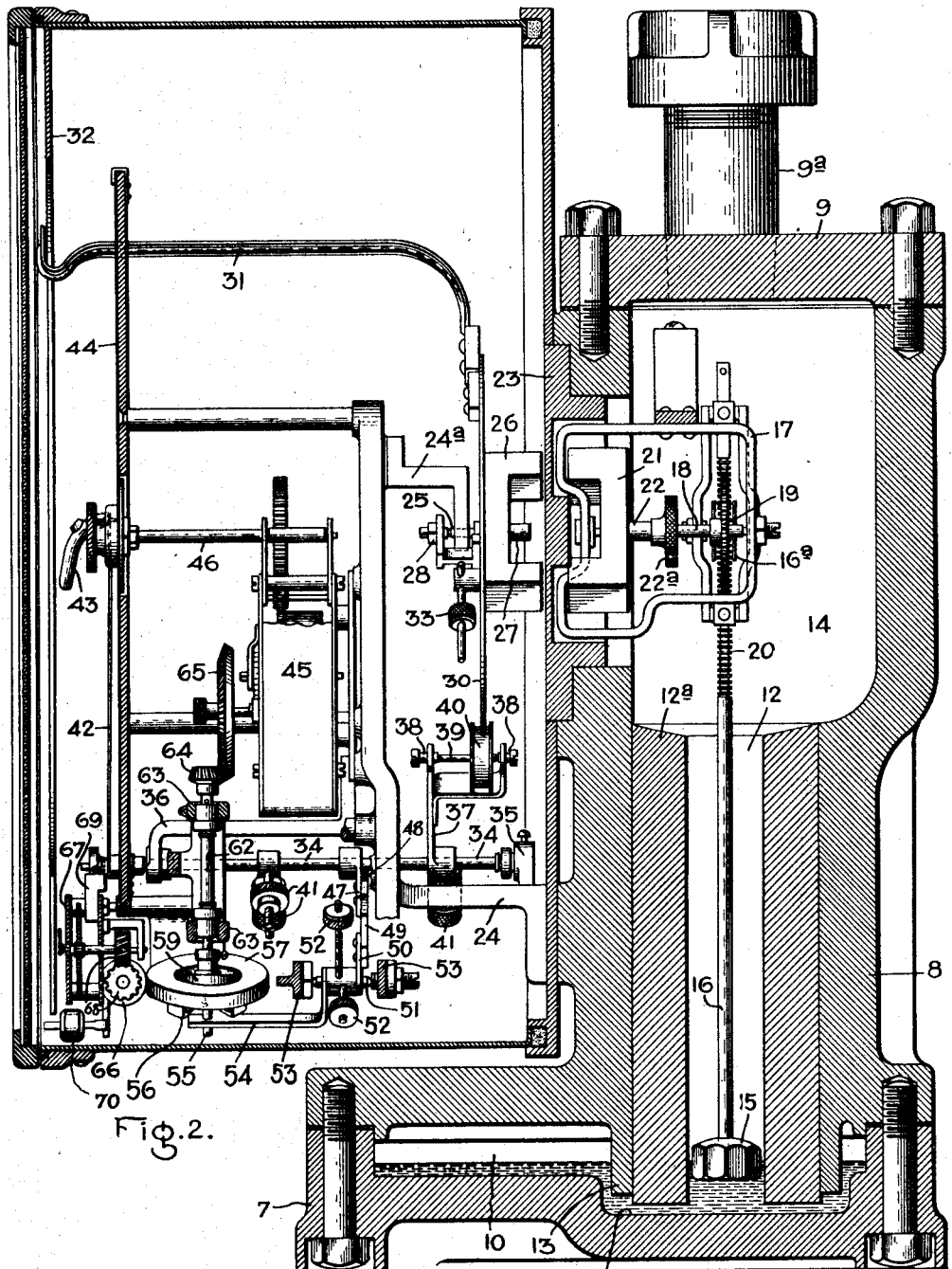

A. R. DODGE.
MEASURING INSTRUMENT.
APPLICATION FILED DEC. 6, 1915.
1,208,518.
Patented Dec. 12, 1916.
3 SHEETS—SHEET 3.
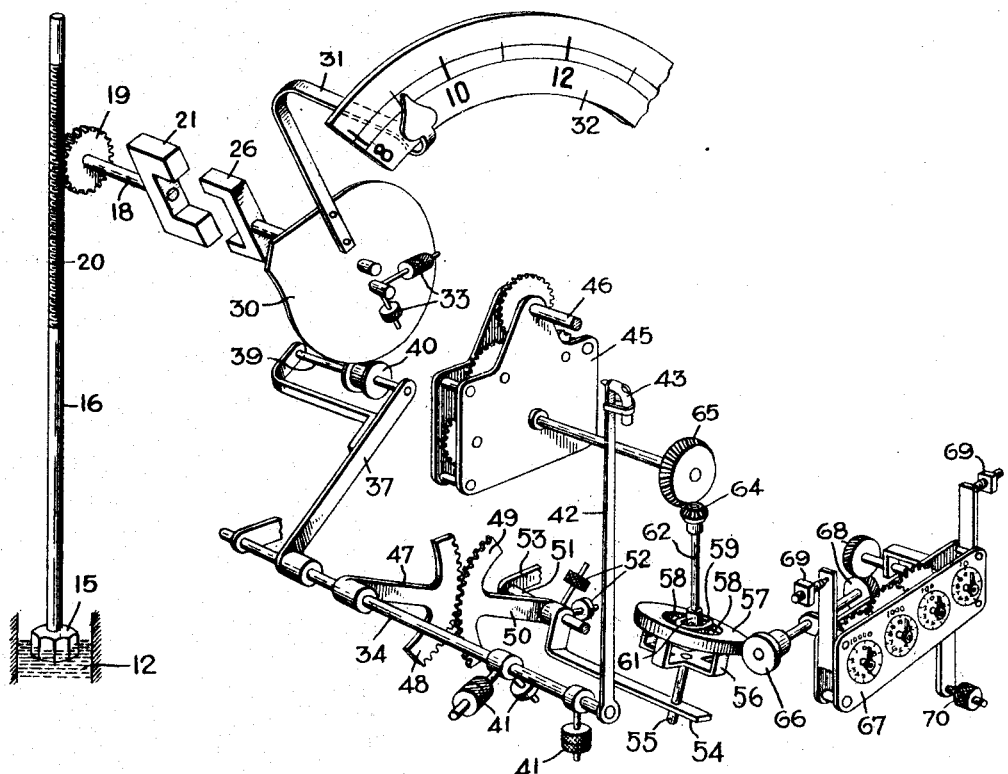
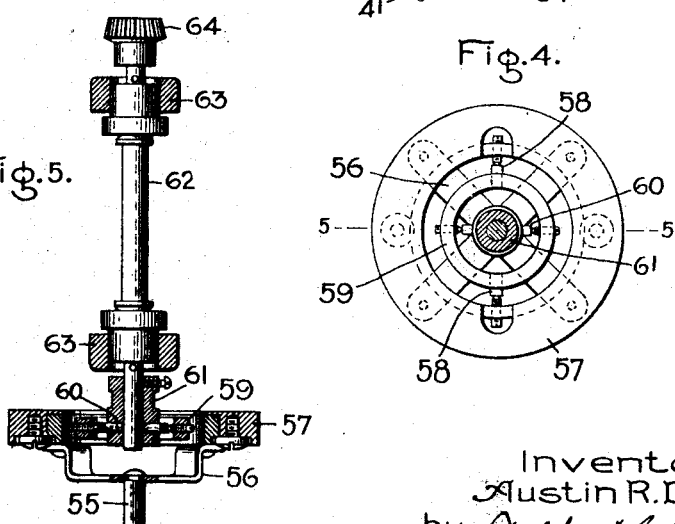
Inventor:
Austin R. Dodge,
by
His Attorney.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

MEASURING INSTRUMENT.

1,208,518.  Specification of Letters Patent.  Patented Dec. 12, 1916.

Application filed December 6, 1915. Serial No. 65,244.

*To all whom it may concern:*

Be it known, that I, AUSTIN R. DODGE, a citizen of the United States, residing at Schenectady, county of Schenectady, State of New York, have invented certain new and useful Improvements in Measuring Instruments, of which the following is a specification.

The present invention relates to measuring instruments, and particularly to integrating attachments therefor, and has for its object to provide an improved structure in an apparatus of this character.

The invention is illustrated and described in the present instance in connection with a flow meter for measuring the flow of fluid through a conduit, but it will be understood that it is not necessarily limited thereto.

For a consideration of what I believe to be novel and my invention, attention is directed to the accompanying specification that it is not necessarily limited thereto.

In the accompanying drawing Figure 1 is a front view of a flow meter illustrating my improvements, a portion of the front face of the meter being broken away in order to show the parts behind it; Fig. 2 is a sectional side view of the meter shown in Fig. 1; Fig. 3 is a skeleton perspective view of the moving parts of the apparatus, the remaining parts being omitted for the purpose of clearness; Fig. 4 is a top plan view of a detail; and Fig. 5 is a sectional view taken on line 5—5, Fig. 4.

Referring to the drawing, the casing or body of the meter is shown as comprising a base 7, upright member 8, and a cap or cover 9. In the base is formed a reservoir 10 which is provided with a well 11 and contains mercury or some other suitable liquid. The member 8 has a cylindrical chamber 12 in it which communicates with the reservoir, the lower end of the chamber having a wall 13 that projects into the well 11. The area of the chamber 12 is determined by means of a filling piece 12ª. The liquid in the reservoir, well and chamber thus has substantially the form of a U-tube column, although one end of the column is approximately annular, while the other end is circular. The annular end has a larger area than the circular end so that a relatively small movement of the liquid in the annular end causes a much larger movement of the liquid in the other end. The upper part of the chamber 12 opens into an enlarged chamber 14 that is closed by the cover 9. Riding on the liquid column in the chamber 12 is a float 15 that is mounted on the lower end of the rod 16.

Secured to the wall of the chamber 14 is a frame 17 in which is mounted a spindle 18. On the right-hand end of the spindle, Fig. 2, is a pinion 19 which meshes with a circular rack 20 on the rod 16. The upper end of the rod passes freely through openings in the frame 17, while a guide wheel 16ª carried by the frame engages the rod opposite the pinion 19 and keeps the rack in mesh with the pinion. The structure thus described permits the rack to swing freely and to turn, but at the same time keeps it in engagement with the pinion. The cover 9 has a tubular extension or dome 9ª to permit the end of the rod 16 to pass up through the cover if the float rises sufficiently.

The other end of the spindle 18 carries a U-shaped magnet 21 which is secured to it by a friction sleeve 22 having a knurled handle 22ª so that the relation of the parts can be adjusted if it is desired. When the casing is made of iron or other magnetic material a plug 23 of non-magnetic material is secured in the wall of the casing opposite the magnet.

Mounted on the upper part of a bracket 24 attached to the front of the casing is a fixed arm 24ª which carries a spindle 25 on which is pivoted a U-shaped magnet 26, one of the bearings being within the sleeve 27 and the other being an adjustable bearing as shown at 28. It will be understood that the second magnet 26 follows the movements of the first magnet 21, as is well known in connection with this type of instrument. Fixed to move with the magnet is a cam member 30 attached to which is a pointer 31 which coöperates with the indicating scale 32 of the meter. This cam and indicating pointer are balanced by means of the adjustable weights 33.

34 is a shaft or spindle supported at its two ends in the brackets 35 and 36.

Fixed on the shaft 34 is a forked arm 37 having bearings 38 in which is mounted a spindle 39 carrying a wheel 40. This wheel engages with the edge of the cam 30. When the cam 30 turns it operates on the arm 37 through the roller 40 to turn the shaft 34. By the use of this roller 40 there is practically no friction in the transmission from the cam to the shaft 34. This means that the meter has to exert but a small force through cam 30 in order to turn the shaft 34, which shaft is balanced by means of the weights 41. As is well known in an instrument of this type, the movement of the float does not bear the same ratio to the flow for all rates of flow, the movement being greater as the flow increases. The cam 30, as is well understood, is so shaped that it turns the shaft 34 equal amounts for equal changes in flow thus compensating for the variable ratio which exists between the flow and the movement of the float. Connected with the left-hand end of the shaft 34, Fig. 2, is an arm 42 carrying a pen 43 which engages the chart 44 so as to continuously record on the chart the indications of the instrument. This chart is driven from a suitable clock mechanism 45 through a shaft 46. Carried by the shaft 34 is an arm 47 to which is fixed a gear sector 48. This gear sector engages a second sector 49 carried by an arm 50 fixed on a spindle 51, the last named spindle being balanced by means of the adjustable weights 52. The spindle 51 is suitably pivoted in the fixed bracket members 53. Carried by the spindle 51 is an arm 54 which engages a pin 55 carried by cross brackets 56 fixed on an annular friction disk 57. This friction disk is pivoted on two studs 58 carried by a ring 59, which ring in turn is pivoted in a plane at right angles to the studs 58 by means of pivots 60 carried by a sleeve 61 fixed on the lower end of a vertical shaft 62 carried in suitable bearings 63. The upper end of the shaft 62 carries a bevel gear 64 which meshes with a bevel gear 65 driven from the clockwork 45. By the above described arrangement it will be seen that the annular friction disk 57 is mounted on gimbal joints so that it may have a universal movement, and that it may be driven continuously by the clockwork 45. Bearing on the edge of the friction disk 57 and extending at an angle thereto is a friction wheel 66 which drives a registering mechanism 67 through the worm wheels 68. This registering mechanism will register the total movement of the wheel 66 and, in conjunction with the other parts, it integrates the flow, as will be pointed out hereinafter.

As is shown best in Figs. 1 and 2, the registering device 57 is carried by pivots 69 and is biased to a position so that its friction wheel 66 engages the edge of the wheel 67 by means of an adjustable weight 70.

The operation is as follows, it being, of course, understood that the instrument in the present instance is connected with the leading and trailing sides of any suitable type of pressure difference creating device in the usual and well known manner.

At zero flow, for example, the float 15 will be in such a position that the pointer 31 will indicate zero; the pen 43 will be at the zero line on the chart 44, and the friction disk 57 will have been moved through the cam mechanism 30 so that it stands at right angles to the wheel 66 which bears upon its edge. The clockwork 45 will be running turning the friction disk 57. This disk 57, however, will impart no movement to the wheel 66 since they stand at right-angles to each other. If now the float 15 rises due to a pressure difference being created by the pressure difference creating device, the rack 20 will turn the pinion 19 thereby turning the magnet 21, and the magnet 26 will follow the movement of the magnet 21, thus moving the indicating pointer 31. At the same time the cam 30 will be moved and through the arm 37 the shaft 34 will be turned. This will move the arm 42 which carries the pen 43 to the proper position for recording the flow on chart 44, and at the same time through the geared sectors 48 and 49 it will cause the friction disk 57 to tilt to a greater or less extent according to the movement of the shaft. The disk 57 will then no longer stand at right-angles to the wheel 66, and as a consequence will begin to drive such wheel, the amount of movement of the wheel 66 depending upon the relative angles between the two wheels. As the friction disk 57 is tilted so that its readings are directly proportional to the amount of the flow, and since it is being continuously driven by the clockwork it will drive the wheel 66, and hence the registering mechanism 67 so as to register the flow. It will be understood that as the flow increases and decreases the shaft 34 will be turned back and forth, and hence the friction disk 57 will be tilted back and forth, and since it is mounted on gimbal joints it can assume any angular position within the limits of its movement relative to the friction wheel 66. This arrangement has the advantage that it is very sensitive and accurate and responds immediately to the slightest change in the flow. Its arrangement in an indicating, recording and registering meter as shown also has the advantage that it is wholly independent of the revolving chart upon which the pen records, so that it need not be disturbed when the chart is being changed.

Since the arm 42 and pen 43 are carried by shaft 34 it will be evident that the pen will be moved nearly equal radial distances on the chart for equal changes in flow. This, therefore, enables me to use a chart having practically a uniform scale, and it will be noted that the circles 75 are, therefore, shown spaced practically equal distances apart. As will be apparent, this is due to the cam 30 being interspersed between the arm 42 and the magnet 26. It will be clear that I can also readily obtain a uniform scale for the indicating pointer 31 by operating the pointer from the shaft 34 instead of directly from the movement of the magnet 26.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with an indicating instrument, of integrating mechanism therefor comprising a disk having a universal support, means for rotating it, a wheel which frictionally engages the edge of the disk, registering mechanism adapted to be driven by the wheel, and means for tilting the disk in accordance with the indications of the instrument.

2. The combination with an indicating instrument, of integrating mechanism comprising a disk, a shaft, a gimbal joint connecting the disk to the shaft, means for turning the shaft, a wheel which frictionally engages the edge of the disk, registering mechanism adapted to be driven by the wheel, and means for tilting the disk in accordance with the indications of the instrument.

3. The combination in a measuring instrument, of integrating mechanism comprising a friction disk member, means for turning it on its axis, a friction wheel member which engages the edge of the disk member, registering mechanism adapted to be driven by the wheel member, a universal support for one of said friction members, and means for tilting the member having the universal support in accordance with the indications of the instrument.

4. The combination in a measuring instrument, of integrating mechanism comprising an annular disk, a shaft, gimbals connecting the disk to the shaft, clock mechanism for driving the shaft, a friction wheel which engages the edge of the disk and extends at an angle to the plane of the disk, registering mechanism driven from the wheel, and means for tilting the disk to vary the angle between the planes of the disk and wheel.

5. The combination in a flow meter, of a disk having a universal support, means for turning it, a wheel which engages the edge of the disk, registering mechanism connected therewith, and means for tilting the disk in accordance with the flow.

6. The combination in a flow meter, of a shaft, means for turning said shaft in proportion to the flow, an annular friction disk having a universal mounting, means for rotating it, a friction wheel which engages the edge of the disk, registering mechanism connected therewith, and means operated by the shaft for tilting the disk.

7. The combination in a flow meter, of a float which is moved in accordance with the flow, a cam connected thereto, a shaft, means connected with the shaft and engaging the cam for turning the shaft, a clock mechanism, a disk having a universal support, means connecting it with the clock mechanism for rotating it, a wheel engaging the edge of the disk, registering mechanism connected with the wheel, and means connecting the shaft to the disk for tilting it.

In witness whereof, I have hereunto set my hand this 4th day of December, 1915.

AUSTIN R. DODGE.